(12) United States Patent
Ogawa

(10) Patent No.: US 8,745,640 B2
(45) Date of Patent: Jun. 3, 2014

(54) INTEGRATION AND MANAGEMENT APPARATUS, INTEGRATION AND MANAGEMENT SYSTEM AND COMPUTER READABLE INFORMATION RECORDING MEDIUM

(75) Inventor: Yuuki Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 543 days.

(21) Appl. No.: 12/871,088

(22) Filed: Aug. 30, 2010

(65) Prior Publication Data
US 2011/0061066 A1 Mar. 10, 2011

(30) Foreign Application Priority Data
Sep. 10, 2009 (JP) .................. 2009-209662

(51) Int. Cl.
*G06F 9/44* (2006.01)
*G06F 15/173* (2006.01)
(52) U.S. Cl.
USPC .......................................... 719/328; 709/223
(58) Field of Classification Search
USPC .......................................................... 719/328
See application file for complete search history.

(56) References Cited

U.S. PATENT DOCUMENTS

| 6,236,994 B1 * | 5/2001 | Swartz et al. ................. 707/635 |
| 2003/0121006 A1 * | 6/2003 | Tabata et al. .................. 715/513 |
| 2006/0041654 A1 | 2/2006 | Aki et al. |
| 2008/0174790 A1 * | 7/2008 | Noguchi et al. ............... 358/1.1 |
| 2008/0307428 A1 | 12/2008 | Hagiwara et al. |
| 2009/0119553 A1 | 5/2009 | Matsushima |

FOREIGN PATENT DOCUMENTS

| JP | 2006-058921 | 3/2006 |
| JP | 2008-305004 | 12/2008 |
| JP | 2009-134695 | 6/2009 |

OTHER PUBLICATIONS

Anonymous: "Plug-in (Computing)", Wikipedia, the free encyclopedia, Sep. 4, 2009, pp. 1-4.
Extended European Search Report dated Dec. 27, 2010.

* cited by examiner

*Primary Examiner* — Andy Ho
*Assistant Examiner* — Abdou Seye
(74) *Attorney, Agent, or Firm* — IPUSA, PLLC

(57) ABSTRACT

An integration and management apparatus is connected to an information processing apparatus in which one or plural pieces of software operates, which one or plural pieces of software has a program interface opened to the outside and realizes a function, and includes an obtaining part that obtains, from the software, a linkage software component including setting information and an extended program for a linkage of the function realized by the one or plural pieces of software; an analyzing part that analyzes the linkage software component obtained by the obtaining part, and obtains an analyzing result; and an executing part that executes, in response to a function providing request, the extended program, and carries out the linkage of the function by using the program interface provided by the software, based on the analyzing result obtained by the analyzing part.

15 Claims, 13 Drawing Sheets

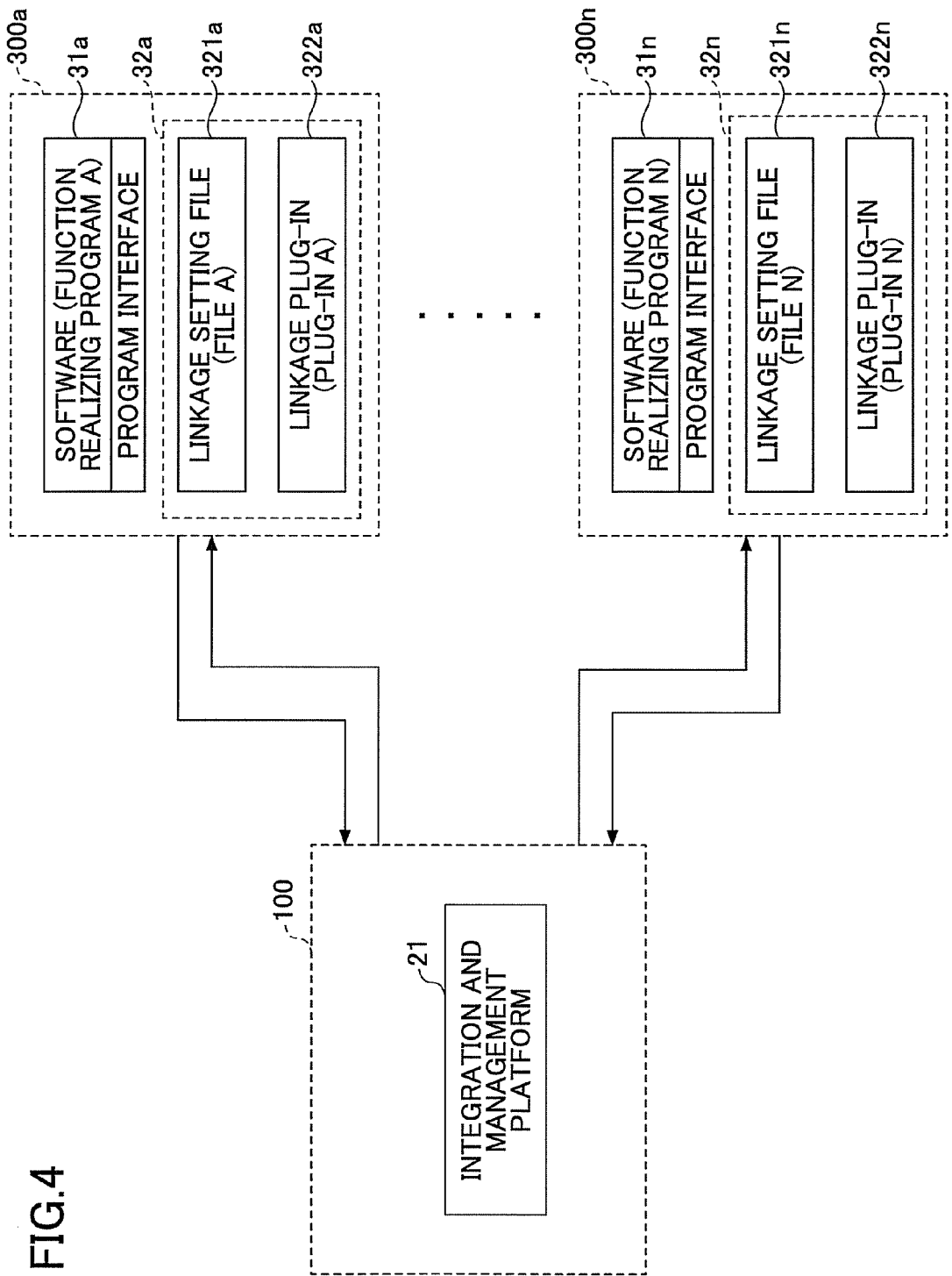

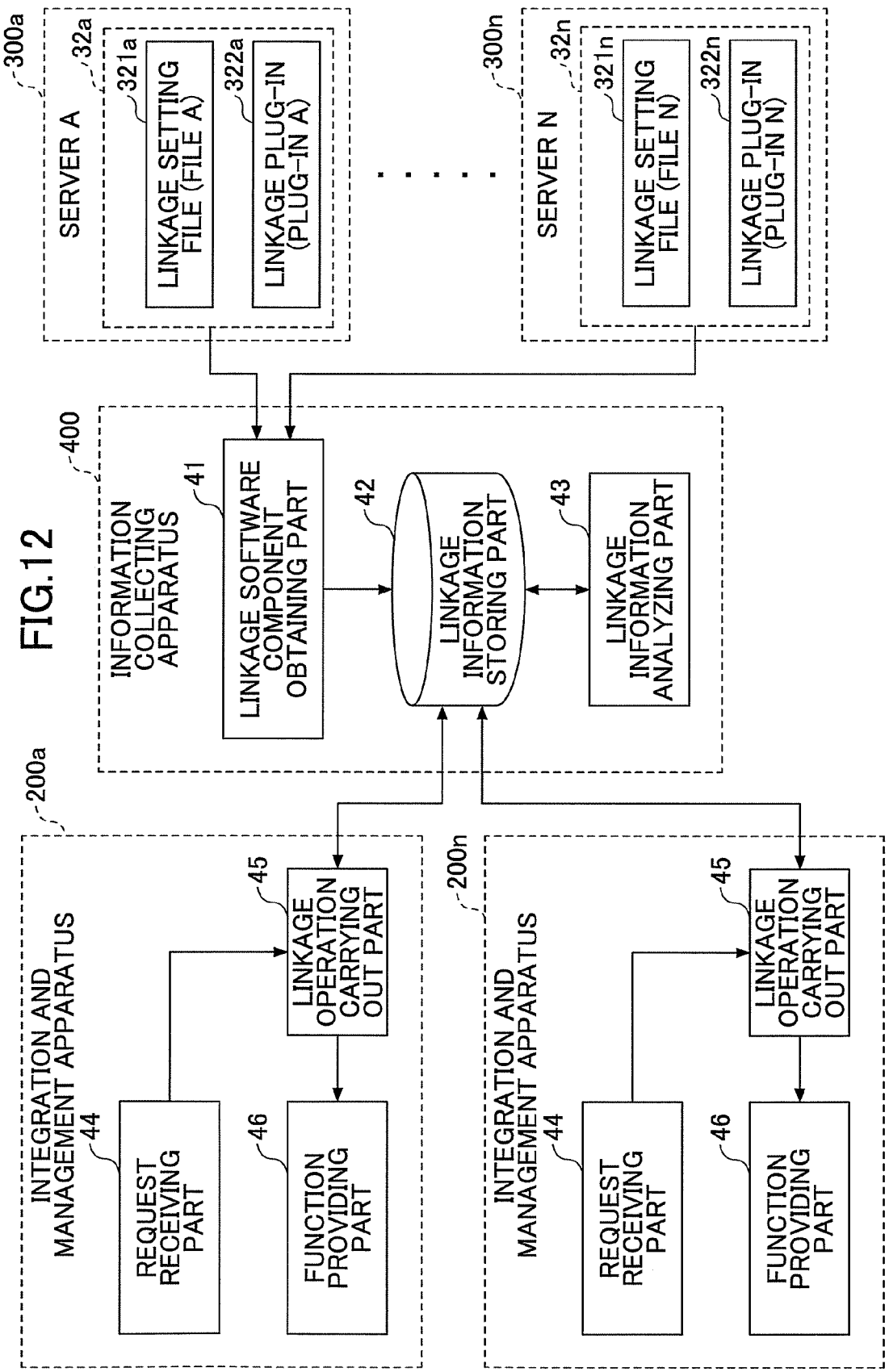

INTEGRATION AND MANAGEMENT APPARATUS, INTEGRATION AND MANAGEMENT SYSTEM AND COMPUTER READABLE INFORMATION RECORDING MEDIUM

BACKGROUND OF THE INVENTION

1. Field of the Invention

The present invention relates to an integration and management apparatus and an integration and management system, which carry out integration and management of plural pieces of software, and, in particular, to an art for realizing a linkage of a function realized by the software.

2. Description of the Related Art

Recently, a server-client-type software product has been introduced to an office environment, and various functions are provided. The various functions include functions to assist in operation and maintenance of apparatuses such as a MFP (Multifunction Peripheral), a LP (Laser Printer) or such which are introduced to the office environment. These functions include, for example, an apparatus management function of managing the introduced apparatuses based on collected apparatus information, a delivering function of realizing a data delivering workflow by using the introduced apparatuses, an authentication function of controlling usage permission of the introduced apparatuses, and so forth. Software products that realize these functions are developed and provided by different development divisions of the same software vendor or by different software vendors.

In the office environment, it is preferable to realize a linkage of the function among the plural software products that are developed and provided from various environments, and carry out integration and management of the functions.

For example, Japanese Laid-Open Patent Application No. 2006-58921 (Patent Document 1) discloses an art relating to an integration and management server that has a part to add or delete a menu for an external system that is to be included in a linkage of a function, and start up and execute the added menu, for the purpose of easy registration or change of a function to be used by a linkage of a function.

However, in such an integration and management system, a linkage of a function for the purpose of using a function for a complementing usage or a mutual usage may be difficult.

It is noted that the complementing usage means complementing usage of the same function realized by plural pieces of software. The mutual usage means mutual usage of different functions realized by plural pieces of software.

Software products provided by software vendors are provided in a form of components to meet various user requirements, and are provided to the outside such as third vendors, IT divisions of enterprises that introduce the software products, or such, by providing program interfaces that are opened to the outside. Operating environments of many of the program interfaces provided in such a way are platforms provided by the software vendors.

Therefore, because of a difference in the operating environment of the provided program interface, it may be difficult to realize a linkage of a function for the above-mentioned purpose of a complementing usage or a mutual usage

SUMMARY OF THE INVENTION

According to the present invention, an integration and management apparatus is connected, by using a predetermined data transmission path, to an information processing apparatus in which one or plural pieces of software operates, which one or plural pieces of software has a program interface opened to the outside and realizes a function. The integration and management apparatus includes an obtaining part that obtains, from the software, a linkage software component including setting information and an extended program for a linkage of the function realized by the one or plural pieces of software; an analyzing part that analyzes the linkage software component obtained by the obtaining part, and obtains an analyzing result; and an executing part that executes, in response to a function providing request, the extended program, and carries out the linkage of the function by using the program interface provided by the software, based on the analyzing result obtained by the analyzing part.

Other objects, features and advantages of the present invention will become more apparent from the following detailed description when read in conjunction with the accompanying drawings.

BRIEF DESCRIPTION OF THE DRAWINGS

FIG. 4 shows a software configuration example for realizing the software integration in the first embodiment of the present invention;

FIG. 12 shows a configuration example of a software integration and management function in the second variant embodiment of the first embodiment of the present invention.

DETAILED DESCRIPTION OF THE EMBODIMENTS

An object of the embodiments of the present invention is to provide an integration and management system and an integration and management apparatus to carry out a linkage of a function for the purpose of a complementing usage or a mutual usage among plural pieces of software.

According to the embodiments, a linkage software component including setting information and an extended program to be used for the linkage of a function is obtained from the software that realizes the function. Then, the obtained linkage software component is analyzed, and an analyzing result of linkage information is obtained. In response to a function providing request, the extended program is executed based on the analyzing result, and the linkage of the function is realized by using a program interface provided by the software.

Thus, it is possible to realize the linkage of the function without the awareness of a difference in the operating environment of the program interface provided by the software. As a result, it is possible to carry out the linkage of the function for the purpose of a complementing usage or a mutual usage among the pieces of software.

Thus, according to the embodiments of the present invention, by obtaining the software component including the setting information and the extended program to be used for the linkage of the function from the software that realizes the function, and analyzing the obtained software component, it is possible to carry out the linkage of the function for the purpose of a complementing usage or a mutual usage among the pieces of software.

Below, the embodiments of the present invention will be described in detail with reference to figures.

First Embodiment

System Configuration

A configuration of a system for carrying out integration and management of plural pieces of software according to the first embodiment of the present invention will be described.

Figure 1:
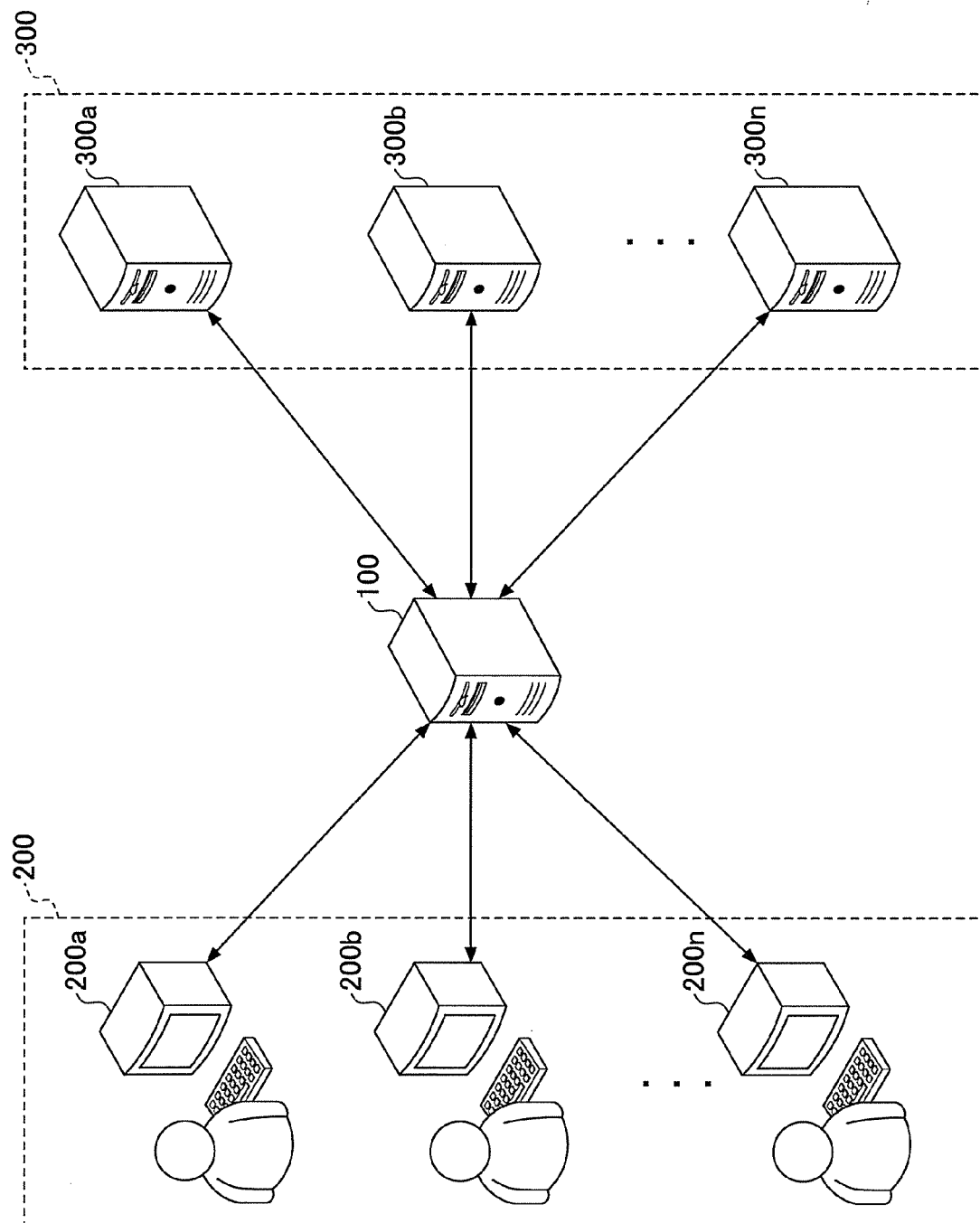
FIG. 1 shows a configuration example of an integration and management system in a first embodiment of the present invention.

FIG. 1 shows a configuration example of an integration and management system 1 in the embodiment 1 of the present invention.

FIG. 1 shows a configuration example of the integration and management system 1 in which an integration and management apparatus (integration and management server) 100 is inserted between plural servers (information processing apparatuses) 300 and plural user terminals (information processing apparatuses) 200. The plural servers 300 include a server A 300a, a server B 300b, . . . and a server N 300n. It is noted that the number of the plural servers 300 including the server A 300a, the server B 300b, . . . and the server N 300n is any number that is two or more. Similarly, the plural user terminals 200 include a user terminal A 200a, a user terminal B 200b, . . . and a user terminal N 200n. It is noted that the number of the plural user terminals 200 including the user terminal A 200a, the user terminal B 200b, . . . and the user terminal N 200n is any number that is two or more. The plural servers 300 have various software mounted therein. Each of the plural user terminals 200 is used by a corresponding user to read information or input an operation request. By the system shown in FIG. 1, the integration and management apparatus 100 can carry out an integration and management of function realized by the software mounted in the servers 300 for the users, and realizes unitarily providing services to the users. That is, the users can access the integration and management apparatus 100 from the user terminals 200, and thus, can receive the services provided by the various software that operate in the system.

Thus, integration of the software is carried out by the integration and management apparatus 100, and the integration and management apparatus 100 can provide a unitary service concerning software management (software integration and management function) to the users.

It is noted that FIG. 1 shows the example in which the plural servers 300 are included. However, an embodiment of the present invention is not limited to this configuration. What is to be integrated and managed according to the present invention is "software". Therefore, there is a case where plural pieces of software are installed in a single server. In such a case, the integration and management apparatus 100 carries out integration and management of the plural pieces of software operate in the single server.

<Hardware Configuration>

Next, a hardware configuration of the integration and management apparatus 100 in which the above-mentioned software integration and management function operates will be described.

Figure 2:
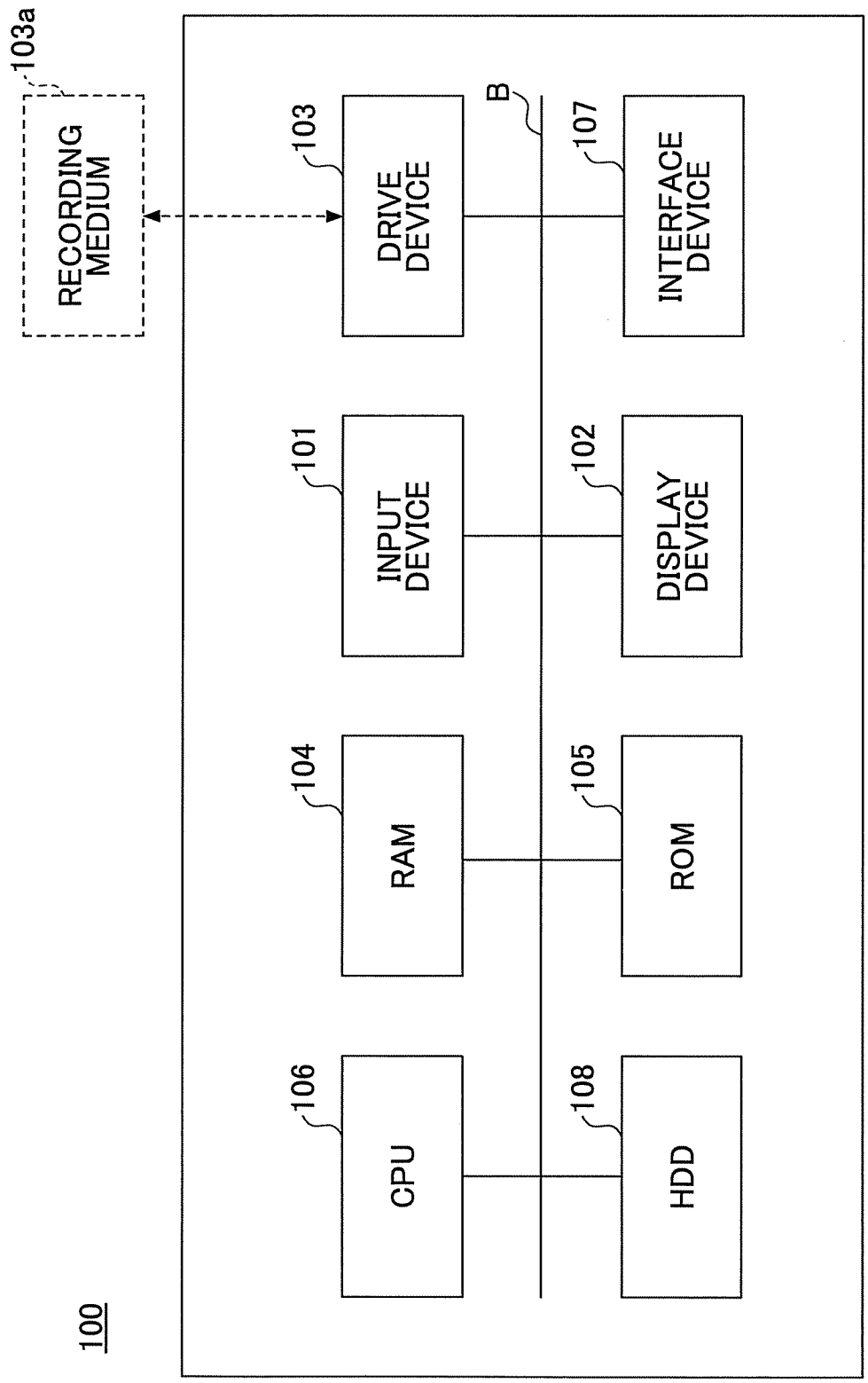
FIG. 2 shows a hardware configuration example of an integration and management apparatus in the first embodiment of the present invention.

FIG. 2 shows a hardware configuration example of the integration and management apparatus 100 in the first embodiment.

As shown in FIG. 2, the integration and management apparatus 100 includes an input device 101, a display device 102, a drive device 103, a RAM (Random Access Memory) 104, a ROM (Read Only Memory) 105, a CPU (Central Processing Unit) 106, an interface device 107, and a HDD (Hard Disk Drive) 108. These devices are mutually connected by a bus B.

The input device 101 includes a keyboard and a mouse, and is used by a user to input various operation signals to the integration and management apparatus 100. The display device 102 includes a display, and displays a result of a process (for example, "information concerning software integration and management") carried out by the integration and management apparatus 100.

The interface device 107 is an interface that connects the integration and management apparatus 100 to a predetermined data transmission path such as a communication network. Therefore, the integration and management apparatus 100 can communicate with the user terminals 200 and the servers 300 by using the interface device 107.

The HDD 108 is a non-volatile storage device that stores various programs and data. The programs and data stored in the HDD 108 include an information processing system that controls the entirety of the integration and management apparatus 100 (for example, an OS (Operating System) that is basic software such as "Windows" (registered trademark), "UNIX (registered trademark)" or such), and applications (software) that provide various functions (for example, the "software integration and management function") in the information processing system. Further, the HDD 108 manages the stored programs and data by using a predetermined file system and/or a DB (database).

The drive device 103 is an interface for a detachable recording medium 103a. Thus, the integration and management apparatus 100 can read from and/or write to the recording medium 103a by using the drive device 103.

The ROM 105 is a non-volatile semiconductor memory (storage device) that can hold internal data even after the power supply is stopped. The ROM 105 stores BIOS (Basic Input/Output System) executed when the integration and management apparatus 100 is started up, data such as a system construction and a network-related setting of the integration and management apparatus 100, and so forth.

The RAM 104 is a volatile semiconductor memory (storage device) that temporarily holds a program or data read from the above-mentioned respective storage devices. The CPU 106 executes programs read to the RAM 104, and thereby, carries out control of the entirety of the integration and management apparatus 100 and operations of various functions mounted in the ingratiation and management apparatus 100.

By the hardware configuration, in the integration and management apparatus 100, for example, the CPU 106 executes a program (a software component that realizes a function mounted in the integration and management apparatus 100) read from the HDD 108 to the RAM 104, and realizes the mounted function.

As can be seen from the above-mentioned hardware configuration, the integration and management apparatus 100 has a configuration approximately the same as a PC (Personal Computer).

<Software Integration and Management Function>

A software integration and management function in the first embodiment will now be described.

The integration and management apparatus 100 in the first embodiment obtains a linkage software component including setting information and an extended program to be used for a linkage of a function, from software that realizes the function. The integration and management apparatus 100 analyzes the obtained linkage software component, and obtains an analyzing result. The integration and management apparatus 100 responds to a function providing request, executes the extended program based on the analyzing result, and carries out the linkage of the function by using program interfaces that the software provides. The integration and management apparatus 100 has such an apparatus management function.

A linkage of a function by software integration will now be described.

Figure 3A:
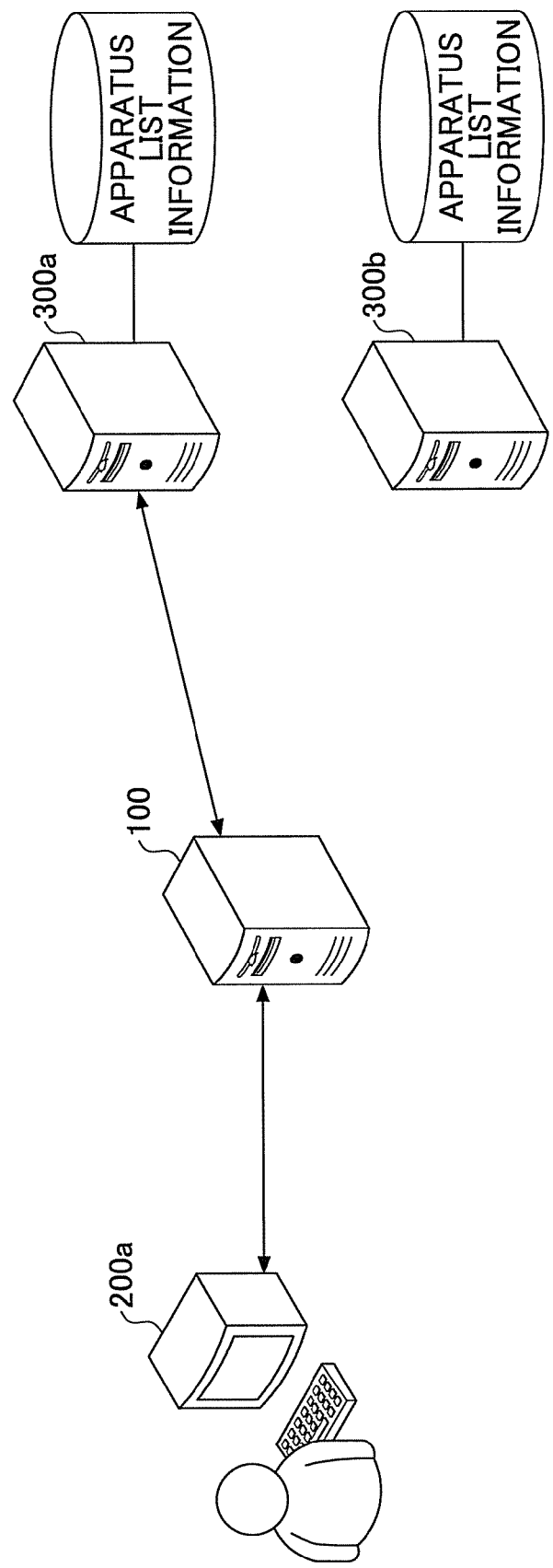
FIGS. 3A and 3B show operation examples of a linkage of a function by means of software integration in the first embodiment of the present invention.
Figure 3B:
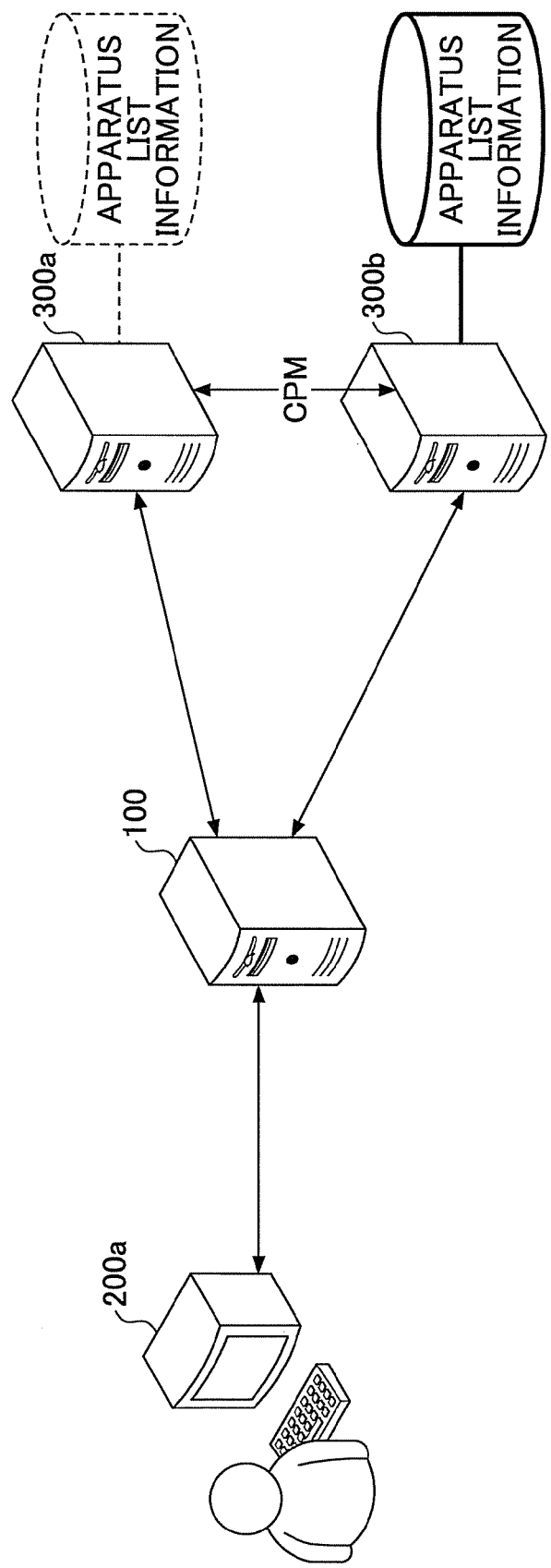

FIGS. 3A and 3B show examples of operations of a linkage of a function by software integration in the first embodiment.

FIGS. 3A and 3B show operation examples of a linkage of a function for the purpose of a complementing usage. For example, the integration and management apparatus 100 shown in FIGS. 3A and 3B provides a scanned document delivering function that the server A 300a (scanned document delivering server) has, and an apparatus management function that the server B 300b (apparatus management server) has, to users.

It is assumed that a user requests from the user terminal A 200a the integration and management apparatus 100 to display an apparatus list of the scanned document delivering function.

In this case, as shown in FIG. 3A, the integration and management apparatus 100 requests the server (scanned document delivering server) A 300a to generate a list display screen page based on apparatus list information ("APPARATUS LIST INFORMATION") that the server A has, and transmits the thus-generated screen page to the user terminal A 200a. Thereby, the user can read the apparatus list of the scanned document delivering function.

It is noted that the server B 300b in which the apparatus management function operates also holds the apparatus list information "APPARATUS LIST INFORMATION" that can be thus read. That is, in the system 1 shown in FIG. 3A, the respective servers 300a and 300b manage the apparatus list information ("APPARATUS LIST INFORMATION") duplicately. This may result in useless consumption of storage resources, and may complicate information management work. Further, the server B 300b (apparatus management server) periodically obtains apparatus information from respective apparatuses, updates the apparatus list information by the obtained apparatus information, and thus, manages the apparatus list information. Thus, the server B 300b has the latest apparatus list information. Therefore, it is necessary to cause the apparatus list information that the server A 300a has to become consistent with the latest apparatus list information that the server B 300b has.

Therefore, in the first embodiment, as shown in FIG. 3B, a linkage of a function by software integration is realized.

In response to receiving an apparatus list display request for the scanned document delivering function, the integration and management apparatus 100 obtains the apparatus list information from the server B 300b (apparatus management server), according to settings concerning a linkage of a function. Next, the integration and management apparatus 100 transmits the obtained apparatus list information to the server A 300a (scanned document delivering server), and requests the server A 300a to generate a list display screen page based on the transmitted apparatus list information. As a result, the integration and management apparatus 100 receives the generated screen page from the server A 300a (scanned document delivering server), and transmits the received screen page to the user terminal A 200a.

Thus, in the system 1 shown in FIG. 3B, the server A 300a (scanned document delivering server) can use the apparatus list information that the server B 300b (apparatus management server) has, in a manner of complementing usage (CPM), by using the integration and management apparatus 100. In the first embodiment, the linkage of the function by using software integration is thus realized. It is noted that although only the complementing usage is described with reference to figures, the first embodiment also realizes a linkage of a function for the purpose of a mutual usage in the same manner.

There may occur a problem from a difference in an operating environment of a program interface provided by software that realizes a function. The "program interfaces" are, for example, API (Application Program Interfaces).

For example, in a case where software vendors that respectively provide a software product that realizes the above-mentioned scanned document delivering function and a software product that realizes the above-mentioned apparatus management function are different from one another, respective operating environments of program interfaces provided by the program products may be different from one another. Further, even when the same software vendor provides the respective software products, the same problem may occur in a case where development divisions that have developed the software products are different from one another, and the development has been performed without considering compatibility between the respective operating environments.

The linkage of the function described above is realizable as a result of program interfaces provided by software that realizes functions being used. For example, in a case where the integration and management apparatus 100 uses the apparatus list information that the apparatus management function has, when the scanned document delivering function displays the apparatus list, the following process using the program interfaces will be carried out. That is, the integration and management apparatus 100 obtains the apparatus list information by using the program interface provided by software that realizes the apparatus management function, transfers the obtained apparatus list information to the program interface provided by software that realizes the scanned document delivering function, and requests the software that realizes the scanned document delivering function to generate the list screen page. In this case, the difference in the operating environment of the program interface may make realization of linkage of the function difficult.

Therefore, the integration and management apparatus 100 in the first embodiment obtains, from the software that realizes a function, a linkage software component including setting information and an extended program to be used for the linkage of the function, and absorbs the difference in the operating environment of the program interface.

Thereby, the integration and management apparatus 100 in the first embodiment realizes the linkage of the function for the purpose of a complementing usage or a mutual usage among the plural pieces of software.

Below, a configuration and operations of the above-mentioned software integration and management function will be described.

FIG. 4 shows an example of software configuration that realizes software integration in the first embodiment.

With reference to FIG. 4, the software configuration of the server 300a will now be described as a typical example. Each of the other servers 300b, . . . and 300n has the same configuration and duplicate description thereof may be appropriately omitted. The server 300a has software 31a that is a function realizing program having a program interface that is opened to the outside, and a linkage software component 32a. The linkage software component 32a includes setting information and an extended program that are necessary to use the program interface provided by the software 31a in the linkage of the function carried out by the integration and management apparatus 100. Specifically, a linkage setting file 321a (setting information to be used for the linkage of the function) in which various information necessary for the linkage of the function is set, and a linkage plug-in 322a (extended program to be used for the linkage of the function) that is an extended program that carries out a function linkage process using the program interface provided by the software 31a, are included. Similarly, the server 300n has software 31n and a linkage software component 32n. The linkage software component 32n includes a linkage setting file 321n and a linkage plug-in 322n.

The integration and management apparatus 100 has an integration and management platform 21 that provides an operating environment for realizing the linkage of the function by means of software integration. The integration and management platform 21 loads the linkage software components 32a, . . . and 32n from the server 300a, . . . 300n at a time of starting up. Thereby, the integration and management platform 21 can cause the linkage plug-ins 322a, . . . and 322n to operate based on the setting information of the linkage setting files 321a, . . . and 321n for example.

The integration and management system 1 in the first embodiment realizes the software integration and management function from the above-mentioned software configuration. It is noted that in the first embodiment, as described above, it is assumed that the linkage software components 32a, . . . and 32n are provided by the side (software vendors) which provides the software 31a, . . . and 31n that realize the function to be linked, as described above. For this purpose, the specification of the integration and management platform 21 will be disclosed to the side that provides the software that realizes the function to be linked.

Figure 5:
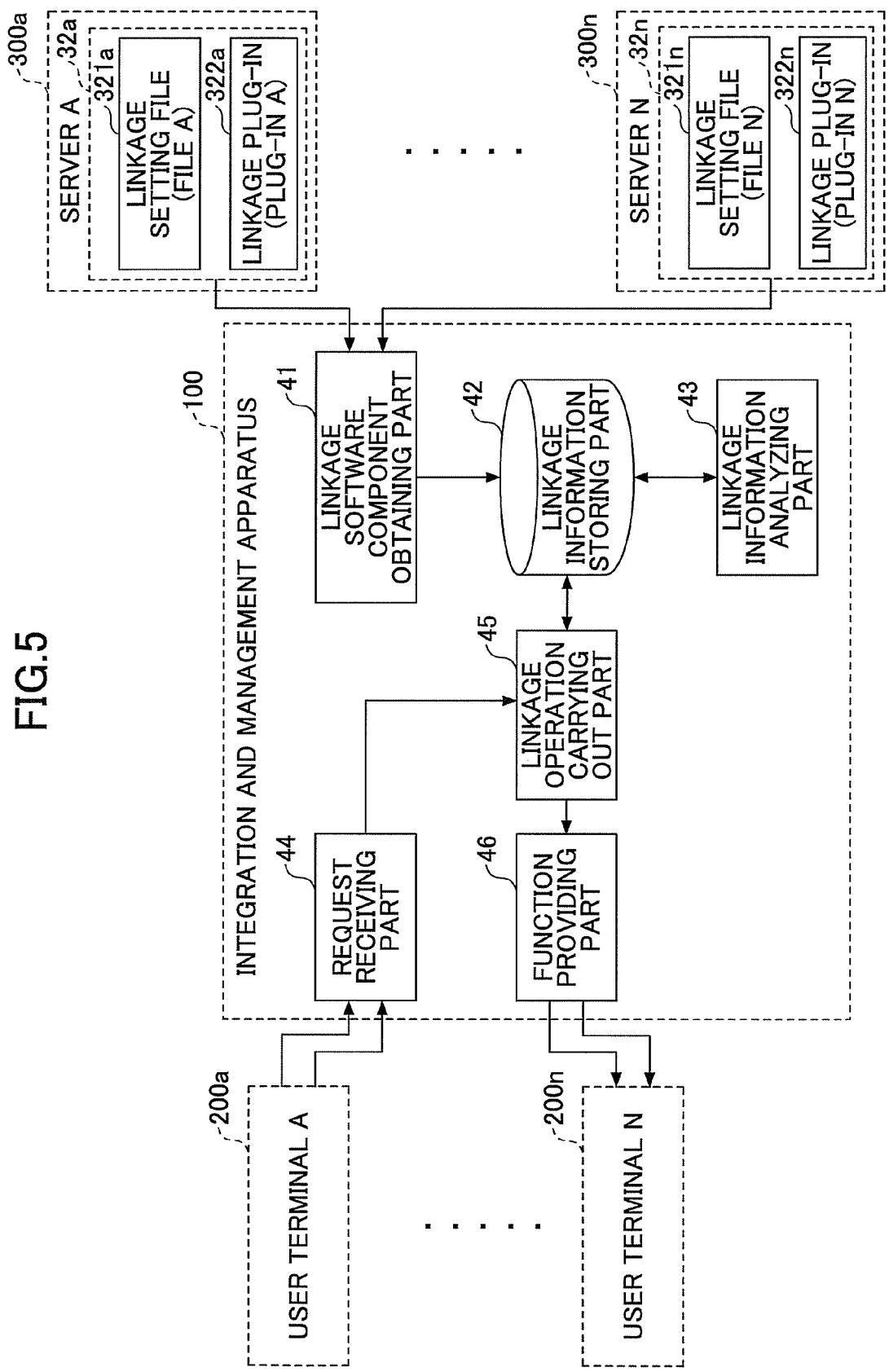
FIG. 5 shows a configuration example of a software integration and management function in the first embodiment of the present invention.

FIG. 5 shows a configuration example of the software integration and management function in the first embodiment.

The integration and management apparatus 100 in the first embodiment operates the platform 21, and thus, provides various functional parts including a linkage software component obtaining part 41, a linkage information storing part 42, a linkage information analyzing part 43, a request receiving part 44, a linkage operation carrying out part 45 and a function providing part 46.

These functional parts are generally classified into functions of mainly carrying out "obtaining and analyzing information concerning the linkage of the functions" and functions of carrying out "the linkage of the function".

The functions of mainly carrying out "obtaining and analyzing information concerning the linkage of the function" are realized by the linkage software component obtaining part 41, the linkage information storing part 42 and the linkage information analyzing part 43.

The linkage software component obtaining part 41 obtains the linkage software components 32a, . . . and 32n from the software 31a, . . . and 31n that operate in the servers 300a, . . . and 300n, respectively, via the predetermined transmission paths. Thereby, the integration and management apparatus 100 obtains the linkage setting files 321a, . . . and 321n and the linkage plug-ins 322a, . . . and 322n that are provided by the software vendors and correspond to the pieces of software 31a, . . . and 31n, respectively. The linkage software component obtaining part 41 obtains the linkage software components 32a, . . . and 32n at predetermined timings such as a case where the new servers 300a, . . . and 300n are introduced or a case where the new pieces of software 32a, . . . and 32n are installed in the servers 300a, . . . and 300n, respectively, for example.

The linkage software components 32a, . . . and 32n are stored by the linkage software component obtaining part 41 in the linkage information storing part 42 in which the information concerning the linkage of the function is stored.

The linkage information storing part 42 is realized by a predetermined storage area in a storage device (for example, "HDD") included in the integration and management apparatus 100. In the linkage information storing part 42, for example, the above-mentioned linkage software components 32a, . . . and 32n, and analyzing results of the linkage software components 32a, . . . and 32n, as being associated with the pieces of software 31a, . . . and 31n, respectively, are stored.

The linkage information analyzing part 43 analyzes the linkage software components 32a, . . . and 32n stored in the linkage information storing part 42, and obtains analyzing results. Specific contents of an analyzing process of the linkage information analyzing part 43 will be described with reference to FIGS. 6 and 7.

Figure 6:
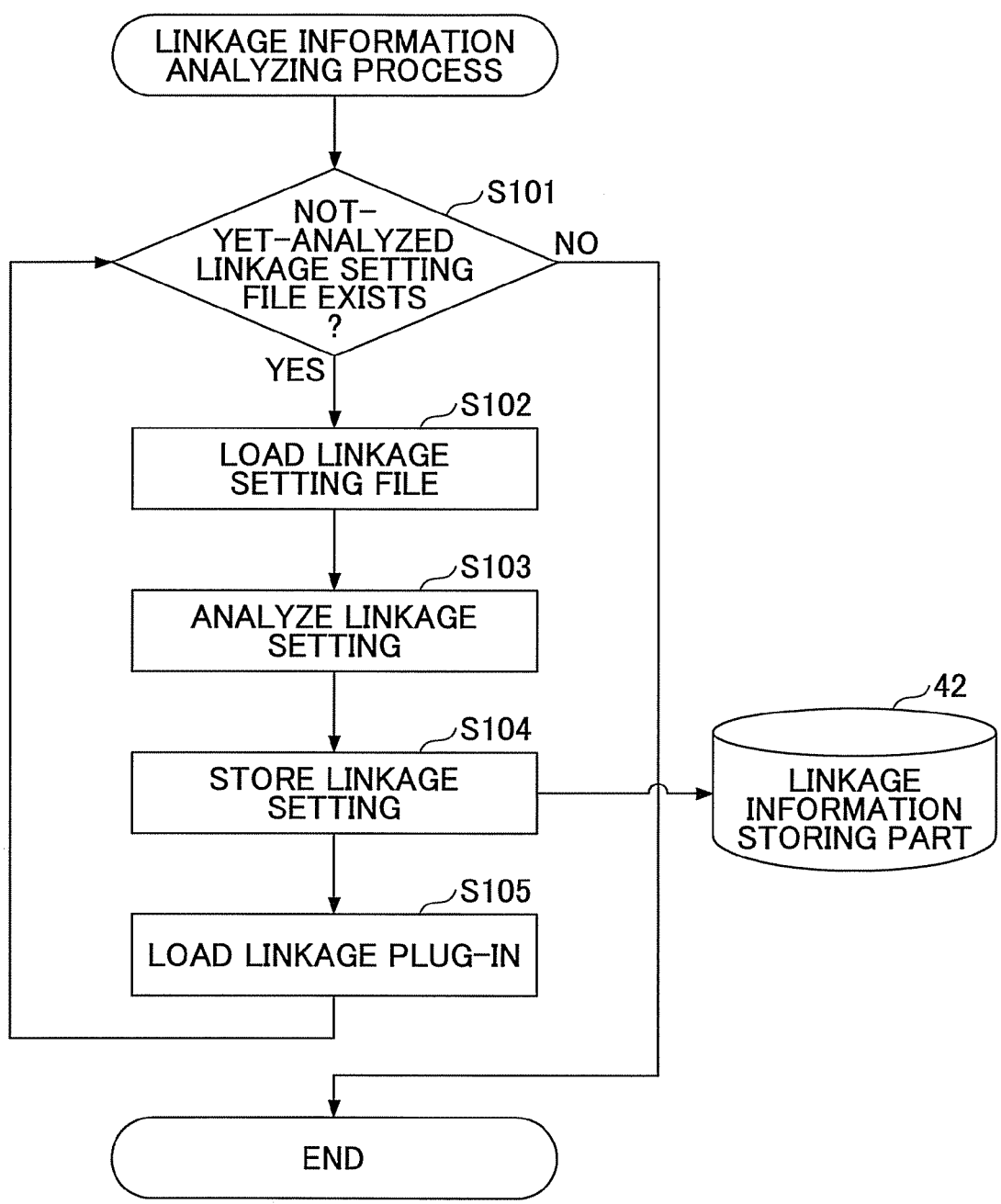
FIG. 6 is a flowchart showing a process procedure example of analyzing linkage information in the first embodiment of the present invention.

FIG. 6 is a flowchart showing a process procedure example of analyzing linkage information in the first embodiment.

As shown in FIG. 6, first, the linkage information analyzing part 43 accesses the linkage information storing part 42, and determines whether the linkage setting files 321a, . . . and 321n of the linkage software components 32a, . . . and 32n stored in the linkage information storing part 42 include a linkage setting file that has not been analyzed yet (step S101). As described above, in the linkage information storing part 42, the linkage software components 32a, . . . and 32n and the analyzing results are stored in a manner of being associated with each other, respectively, in a case where the linkage software components 32a, . . . and 32n have been already analyzed. Therefrom, the linkage information analyzing part 43 carries out the above-mentioned determination by accessing the linkage information storing part 42 and determining whether there is a linkage software component that is not yet associated with a corresponding analyzing result.

The linkage information analyzing part 43 finishes the process in a case where there is no linkage setting file that has not been analyzed yet (step S101: NO).

The linkage information analyzing part 43 loads a corresponding one of the linkage setting files 321a, . . . and 321n (step S102) in a case where there is the linkage setting file that has not been analyzed yet (step S101: YES).

The linkage information analyzing part 43 analyzes the contents of the loaded linkage setting file 321a, . . . or 321n (step S103).

Figure 7:
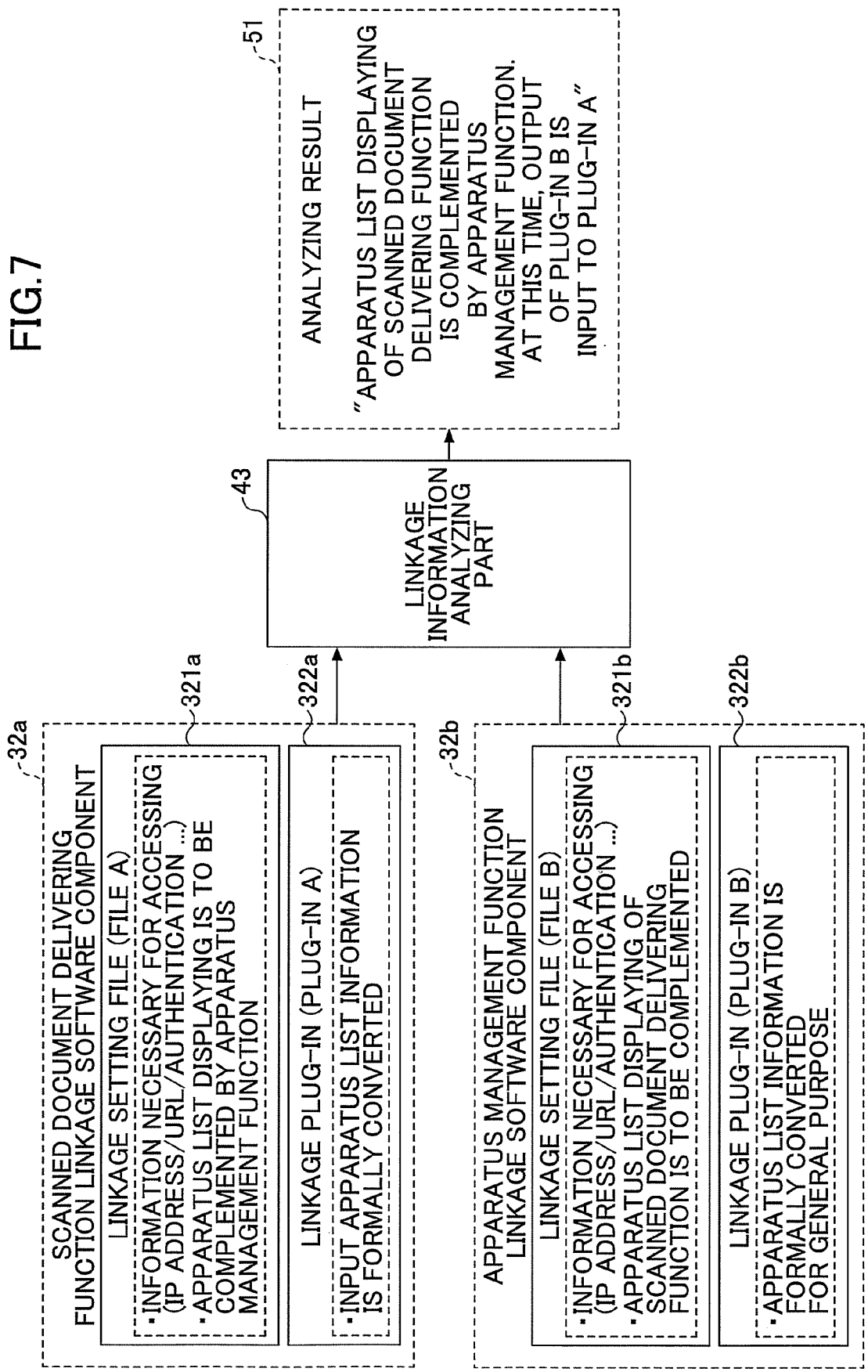
FIG. 7 shows an operation example of analyzing the linkage information in the first embodiment of the present invention.

FIG. 7 shows an operation example of analyzing linkage information in the first embodiment.

FIG. 7 shows an operation example for a case where the linkage setting file 321a of the scanned document delivering function and the linkage setting file 321b of the apparatus management function are to be analyzed.

As shown in FIG. 7, in the linkage setting file 321a of the scanned document delivering function, information necessary for accessing at a time of a linkage of a function such as an IP (Internet Protocol) address, a URL (Uniform Resource Locator) and authentication information is set. Further, in the linkage setting file 321a, a linkage process of apparatus list displaying of the scanned document delivering function being complemented by the apparatus management function is set. The linkage software component 32a of the scanned document delivering function has the linkage plug-in 322a prescribing a process of converting input apparatus list information into a data form appropriate for being used in the scanned document delivering function, corresponding to the setting of the above-mentioned linkage process.

Further, in the linkage setting file 321b of the apparatus management function, information necessary for accessing at a time of a linkage of a function such as an IP (Internet Protocol) address, a URL (Uniform Resource Locator) and authentication information is set. Further, in the linkage setting file 321b, a linkage process of complementing apparatus list displaying of the scanned document delivering function is set. The linkage software component 32b of the apparatus management function has the linkage plug-in 322b prescribing a process of converting apparatus list information into a general-purpose data form usable by the scanned document delivering function, corresponding to the setting of the above-mentioned linkage process.

The linkage information analyzing part 43 analyzes the above-mentioned setting contents of the linkage setting files 321a and 321b. As a result, the linkage information analyzing part 43 obtains an analyzing result 51. FIG. 7 shows an example of the analyzing result 51 from the above-mentioned setting contents, "APPARATUS LIST DISPLAYING OF SCANNED DOCUMENT DELIVERING FUNCTION IS COMPLEMENTED BY APPARATUS MANAGEMENT FUNCTION. AT THIS TIME, OUTPUT OF PLUG-IN B IS INPUT TO PLUG-IN A". This means that apparatus list displaying of the scanned document delivering function is complemented by apparatus list information that the apparatus management function has, and, at this time, an output of the linkage plug-in 322b is input to the linkage plug-in 322a. It is noted that in a case where the linkage plug-ins 322a and 322b are mounted according to Java (registered trademark), transfer of a data form is realized by using only POJO (Plain Old Java Object).

Thus, the linkage information analyzing part 43 obtains the settings concerning the linkage of the function (i.e., the analyzing result 51, including settings of "whether a function to be linked for realizing a requested function exists", and "a specific method of the linkage"), which have been provided by the side (software vendors) which provides the software 31a and 31b, by analyzing the above-mentioned setting contents.

Returning to FIG. 6, a process procedure of step S104 will now be described.

The linkage information analyzing part 43 stores the settings concerning the linkage of the function obtained from the analyzing (step S104). The linkage information analyzing part 43 stores the analyzing result 51 in the linkage information storing part 42 in such a manner as being associated with the linkage software components 32a and 32b to be analyzed.

The linkage information analyzing part 43 loads the linkage plug-ins 322a and 322b included in the linkage software components 32a and 32b to be analyzed (step S105), and proceeds to the determination procedure of step S101. Therefore, while there remains linkage setting file 321a, . . . or 321n that has not been analyzed, the linkage information analyzing part 43 carries out the above-mentioned analyzing process in sequence, and obtains an analyzing result 51.

It is noted that the linkage software components 32a, . . . and 32n may be changed or updated by the side (software vendors) which provides the software 31a, . . . and 31n. For such a case, the linkage information analyzing part 43 carries out the determination of step S101, using flag control, for example. In the linkage information storing part 42, update flags are stored as being associated with the linkage software components 32a, . . . and 32n, respectively. In a case where the linkage software component obtaining part 41 obtains an updated linkage software component 32a, . . . or 32n, the linkage software component obtaining part 41 turns on the corresponding update flag when storing the updated linkage software component 32a, . . . or 32n in the linkage information storing part 42. Thereby, the linkage information analyzing part 43 reads the update flag, and determines whether there is a linkage stetting file 321a, . . . or 321n that has not been analyzed.

Returning to FIG. 5, the functions of carrying out "the linkage of the function" will now be described. The functions of carrying out "the linkage of the function" are carried out by the request receiving part 44, the linkage operation carrying out part 45 and the function providing part 46.

The request receiving part 44 receives a request concerning providing a function by a user. The request concerning providing a function may be, for example, an apparatus list displaying request of the scanned document delivering function mentioned above, and is sent from the user terminal 200a, . . . or 200n.

Based on the analyzing result 51 from the linkage information analyzing part 43, the linkage operation carrying out part 45 executes the corresponding ones of the linkage plug-in 322a, . . . and 322n (extended programs to be used for the linkage of the function), and carries out the linkage of the function using the program interfaces provided by the corresponding ones of the software 31a, . . . and 31n. The linkage operation carrying out part 45 carries out the linkage of the function in response to the function providing request received by the request receiving part 44. In response to the function providing request, the linkage operation carrying out part 45 accesses the linkage information storing part 42, and reads the analyzing result 51 stored by the linkage information storing part 42. Based on the read analyzing result 51, the linkage operation carrying out part 45 determines whether there is a function (provided by the corresponding one of the software 31a, . . . and 31n) to be used for the linkage of the function for the purpose of complementing usage or mutual usage to realize the requested function. In a case where there is the function to be used for the linkage of the function, the linkage operation carrying out part 45 executes the corresponding one of the linkage plug-ins 322a, . . . and 322n (an extended program to be used for the linkage of the function) according to the setting concerning the linkage of the function included in the analyzing result 51, and carries out the linkage of the function using the program interface provided by the corresponding one of the software 31a, . . . and 31n.

The function providing part 46 provides the requested function that has been realized by the linkage of the function carried out by the linkage operation carrying out part 45, to the request source. For example, in a case where the request receiving part 44 has received the apparatus list displaying request of the scanned document delivering function, the function providing part 46 transmits the apparatus list information displaying screen page data, generated from the linkage of the function that has been carried out by the linkage operation carrying out part 45, to the corresponding one of the user terminal 200a, . . . and 200n, and thus, provides the requested function to the user terminal.

Thus, the software integration and management function of the first embodiment is realized as a result of the respective functional parts carrying out the linkage operations.

Figure 8:
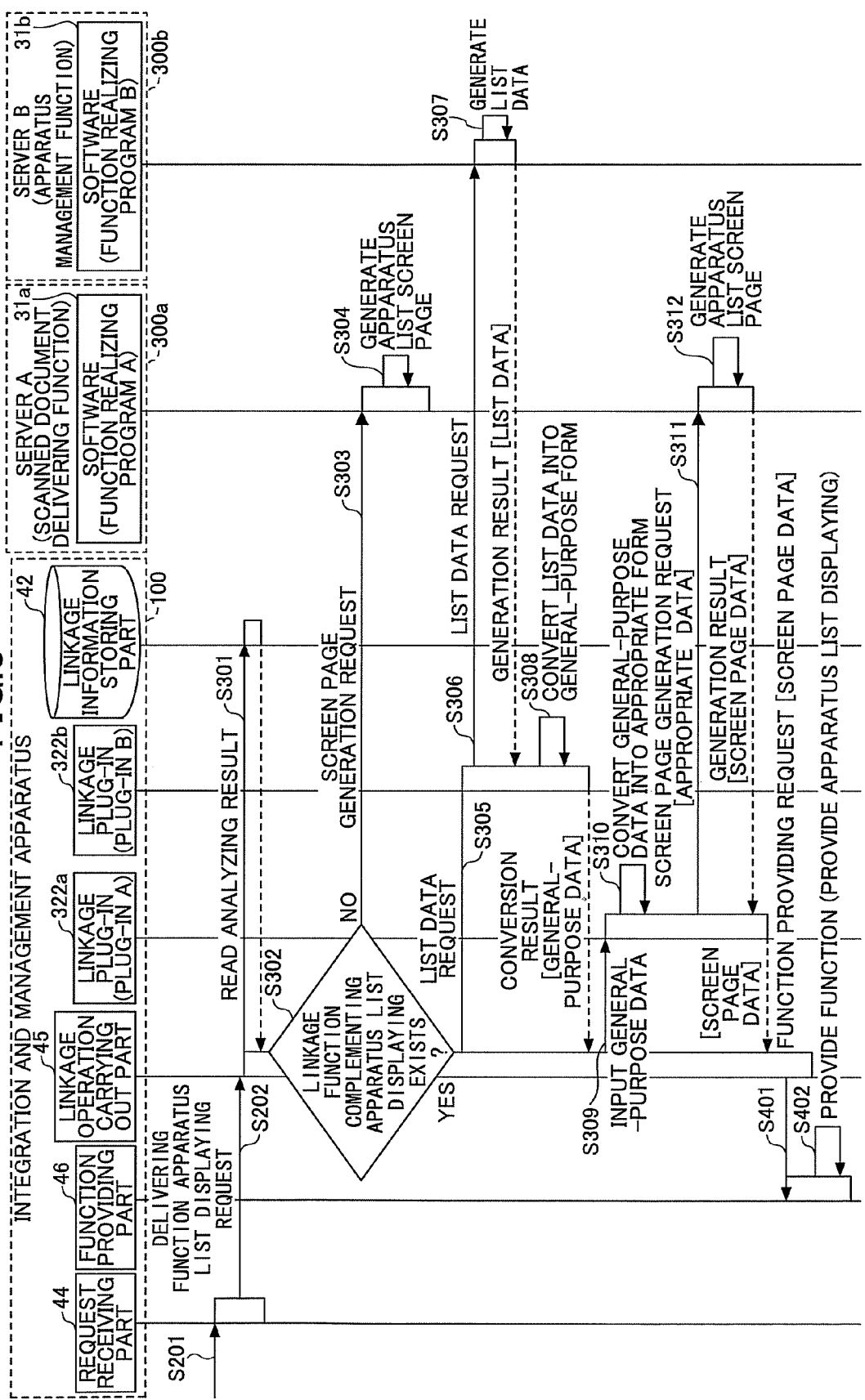
FIG. 8 is a sequence diagram showing a process procedure example of realizing a linkage of a function by means of the software integration in the first embodiment of the present invention.

Next, detailed operations (linkage operations of the respective functional parts) of the software integration and management function will be described with reference to a sequence diagram showing a process procedure (FIG. 8).

The software integration and management function is realized as a result of a program (a software component concerning the software integration and management function) mounted (installed) in the integration and management apparatus 100 being read by the CPU 106 from a storage source (for example, the ROM 105) to the RAM 104, and the following process being carried out by the CPU 106 according to the program.

FIG. 8 is the sequence diagram showing the process procedure carrying out the linkage of the function by means of software integration in the first embodiment. It is noted that FIG. 8 shows the process procedure assuming the case where in response to the apparatus list displaying request of the scanned document delivering function being received from the user, the apparatus list displaying is carried out by means of the linkage with the apparatus management function.

As shown in FIG. 8, the integration and management apparatus 100 receives the apparatus list displaying request of the scanned document delivering function by the request receiving part 44 (step S201).

The integration and management apparatus 100 transfers the received request to the linkage operation carrying out part 45 from the request receiving part 44 (step S202). Thus, in the integration and management apparatus 100, the linkage operation carrying out part 45 carries out the process concerning the linkage of the function in response to the apparatus list displaying request from the user.

The linkage operation carrying out part 45 accesses the linkage information storing part 42, and reads the analyzing result 51 stored in the linkage information storing part 42 (step S301).

Based on the read analyzing result 51, the linkage operation carrying out part 45 determines whether the function to be linked (the function provided by the corresponding one of the software 31a, . . . and 31n) for complementing the apparatus list displaying of the scanned document delivering function exists (step S302). As a result, the linkage operation carrying out part 45 determines that the apparatus management function exists as the function to be linked.

It is noted that in a case where the corresponding function to be linked does not exist (step S302 NO), the linkage operation carrying out part 45 requests the server A 300a that has the scanned document delivering function to generate the apparatus list displaying screen page (step S303). At this time, the linkage operation carrying out part 45 uses the program interface that the software 31a realizing the scanned document delivering function provides, to request the server 300a to generate the apparatus list displaying screen page. As a result, in the server A 300a, the software 31a that realizes the scanned document delivering function generates the apparatus list displaying screen page (step S304).

In a case where the corresponding function to be linked exists (step S302 YES), the linkage operation carrying out part 45 requests the linkage plug-in 322b to provide data of the apparatus list information that the apparatus management function has, according to the setting concerning the linkage of the function included in the analyzing result 51 (step S305). It is noted that the linkage plug-in 322b has been obtained from the software 31b that realizes the apparatus management function and has been loaded.

The linkage plug-in 322b uses the program interface provided by the software 31b that realizes the apparatus management function, to request the software 31b to provide data of the apparatus list information (step S306). As a result, the software 31b generates the requested data of the apparatus list information (step S307), and transmits the generation result [list data] to the linkage plug-in 322b as a reply.

The linkage plug-in 322b converts the received [list data] into a general-purpose data form (step S308), and transmits the conversion result [general-purpose data] to the linkage operation carrying out part 45 that has requested the data of the apparatus list information.

Thus, the linkage operation carrying out part 45 receives the [general-purpose data] of the apparatus list information that the apparatus management function has, as a result of executing the linkage plug-in 322b. The linkage operation carrying out part 45 then inputs the [general-purpose data] of the apparatus list information in the linkage plug-in 322a that has been obtained from the software 31a that realizes the scanned document delivering function and has been loaded (step S309).

The linkage operation carrying out part 45 converts the input [general-purpose data] into a data form appropriate to be used in the scanned document delivering function (step S310).

The linkage plug-in 322a uses the program interface provided by the software 31a that realizes the scanned document delivering function, to request the software 31a to generate the apparatus list displaying screen page by transferring the conversion result [appropriate data] (step S311). As a result, in the server A 300a, the software 31a that realizes the scanned document delivering function generates the apparatus list displaying screen page from the [appropriate data] (step S312). The generation result [screen page data] is then transmitted as a reply to the linkage plug-in 322a that has requested the generation of the apparatus list displaying screen page, and further, is transferred from the plug-in 322a to the linkage operation carrying out part 45 that has input the [general-purpose data] of the apparatus list information. Thus, the linkage operation carrying out part 45 receives the apparatus list displaying screen page in the scanned document delivering function generated by means of the linkage of the function.

In the integration and management apparatus 100, the linkage operation carrying out part 45 transfers the [screen page data] that the linkage operation carrying out part 45 has thus received to the function providing part 46, and requests the function providing part 46 to provide the function (step S401).

The function providing part 46 of the integration and management apparatus 100 transmits the [screen page data] to the user terminal 200a, . . . or 200n via the predetermined transmission path, and provides the apparatus list displaying in the scanned document delivering function to the user terminal (step S402).

<Summary of First Embodiment>

Thus, in the integration and management apparatus 100 of the first embodiment, the linkage software component obtaining part 41 obtains, from the software 31a, . . . and 31n that realize the functions, the linkage software components including the setting information necessary for the linkages of the functions and the extended programs to be used for the linkages of the functions.

In the integration and management apparatus 100, the linkage information analyzing part 43 analyzes the obtained linkage software components (in particular, the linkage setting file 321a, . . . and 321n), and obtains the analyzing results 51. The linkage information analyzing part 43 accesses the linkage information storing part 42, and determines whether the stored linkage software components 32a, . . . and 32n include the linkage setting file 321a, . . . or 321n that has not been analyzed. In a case where the linkage setting file 321a, . . . or 321n that has not been analyzed exists, the linkage information analyzing part 43 loads the corresponding linkage setting file 321a, . . . or 321n (the setting information to be used for the linkage of the function), and obtains the analyzing result 51 by analyzing the setting contents in the file. The linkage information analyzing part 43 loads the linkage plug-in 322a, . . . or 322n (the extended program to be used for the linkage of the function) included in the linkage software component 32a, . . . , or 32n to be analyzed.

In the integration and management apparatus 100, the linkage operation carrying out part 45 executes the extended program (linkage plug-in 322a, . . . or 322n) based on the analyzing result 51 (setting concerning the linkage of the function) in response to the function providing request, and carries out the linkage of the function using the program interface provided by the software 31a, . . . or 31n. When receiving the request, the linkage operation carrying out part 45 accesses the linkage information storing part 42, and reads the stored analyzing results 51. The linkage operation carrying out part 45 determines, based on the analyzing results 51, whether the function (the function provided by the software 31a, . . . or 31n) to be linked for a complementing usage or a mutual usage for realizing the requested function exists. In a case where the function to be linked exists, the linkage operation carrying out part 45 executes the corresponding linkage plug-in 322a, . . . or 322n according to the setting concerning the linkage of the function, and carries out the linkage of the function using the program interface provided by the software 31a, . . . or 31n.

Thereby, the integration and management apparatus 100 can realize the linkage of the function without the awareness of a difference in the operating environment of the program interface provided by the software. As a result, it is possible to carry out the linkage of the function for a complementing usage or a mutual usage among the pieces of software.

[Variant Embodiments of First Embodiment]

In the first embodiment described above, the integration and management apparatus 100 in which the software provided by the software vendor (or manufacturer) and realizing the software integration and management function is installed is introduced. However, a specific method of providing the software integration and management function to a user is not limited to the above-mentioned method of the first embodiment. That is, instead of the method of providing the integration and management apparatus 100, a method of providing software that realizes the software integration and management function may be used, for example.

For example, FIGS. 9 through 12 show systems each realizing the software integration and management function in a user environment as a result of the corresponding software being provided, and functional configuration examples therefor. Below, variant embodiments of the first embodiment will be described with reference to figures.

<<First Variant Embodiment>>

Figure 9:
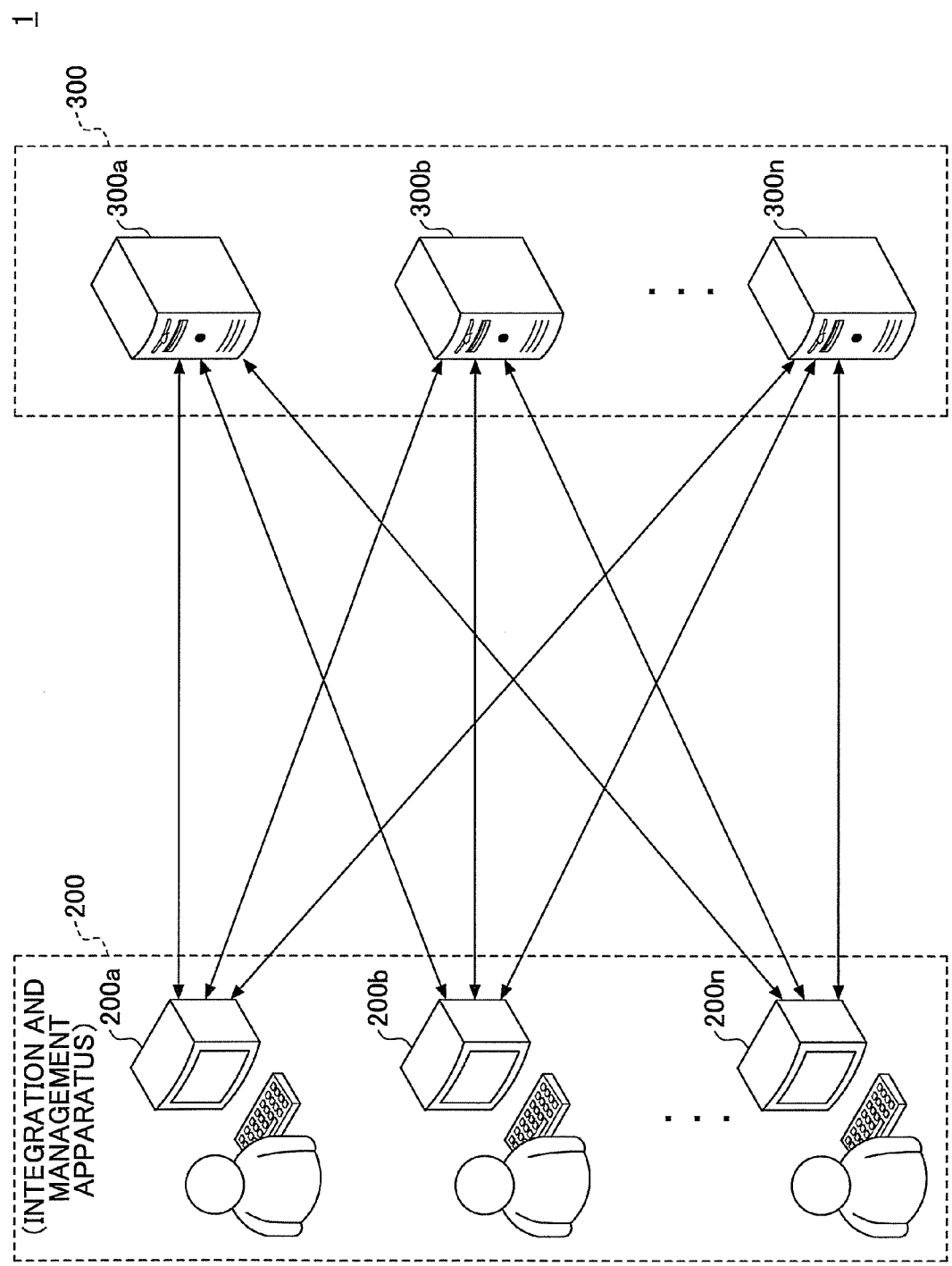
FIG. 9 shows a configuration example of an integration and management system in a first variant embodiment of the first embodiment of the present invention.

FIG. 9 shows a configuration example of an integration and management system in a first variant embodiment of the first embodiment.

According to the first variant embodiment, as shown in FIG. 9, the software that realizes the software integration and management function is installed in each of user terminals 200a, 200b, . . . and 200n, and thus, each of the user terminals 200a, 200b, . . . and 200n acts as an integration and management apparatus. In this case, a functional configuration shown in FIG. 10 may be used, for example.

Figure 10:
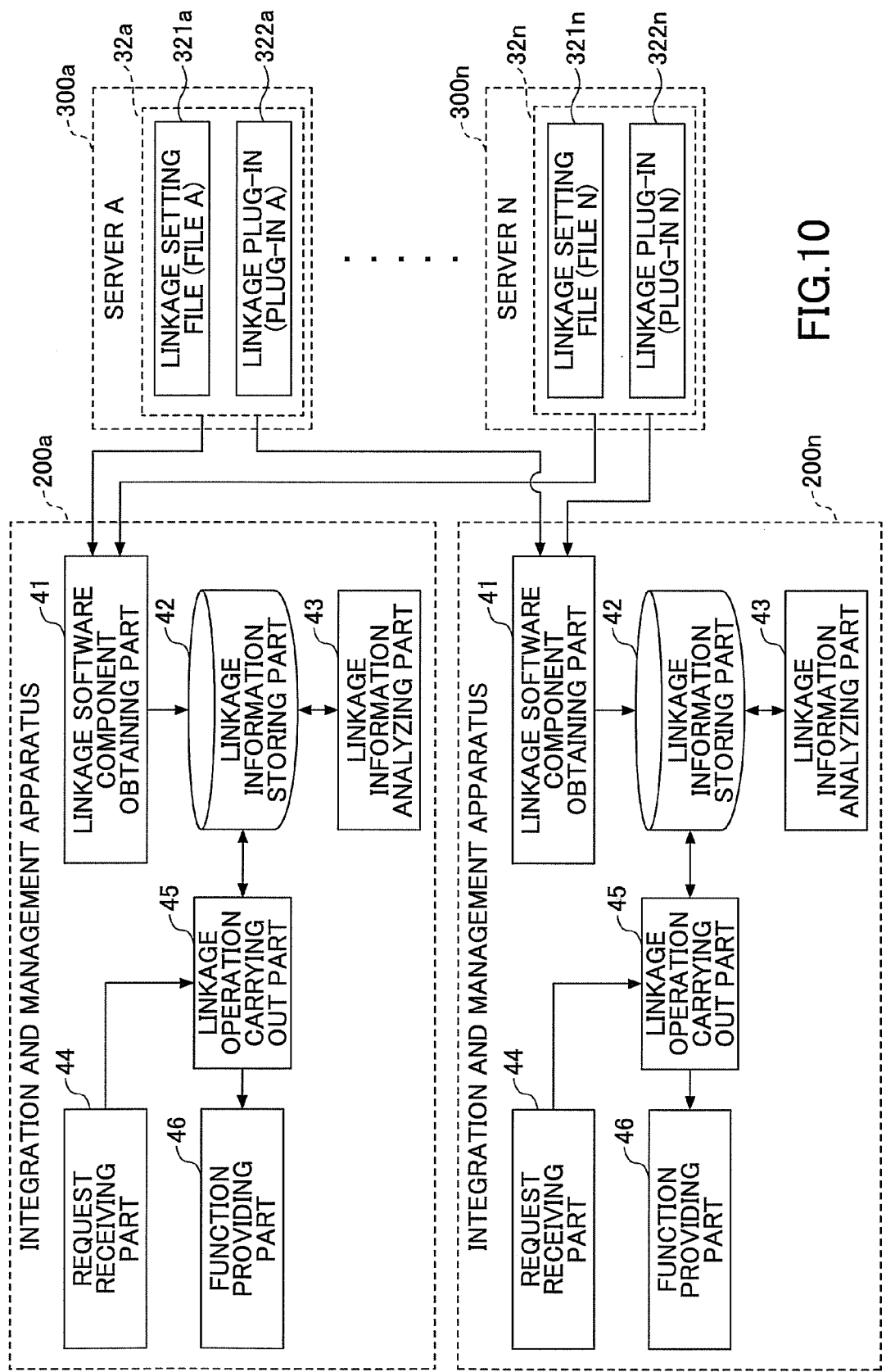
FIG. 10 shows a configuration example of a software integration and management function in the first variant embodiment of the first embodiment of the present invention.

FIG. 10 shows the configuration example of the software integration and management function in the first variant embodiment.

The software integration and management function according to the first variant embodiment shown in FIG. 10 has the functional configuration the same as the functional configuration shown in FIG. 5, and the duplicate description therefor will be omitted. By installing the software that realizes the software integration and management function described above for the first embodiment in each of the user terminals 200a, 200b, . . . and 200n, it is possible to achieve the same function in each user terminal.

<<Second Variant Embodiment>>

Figure 11:
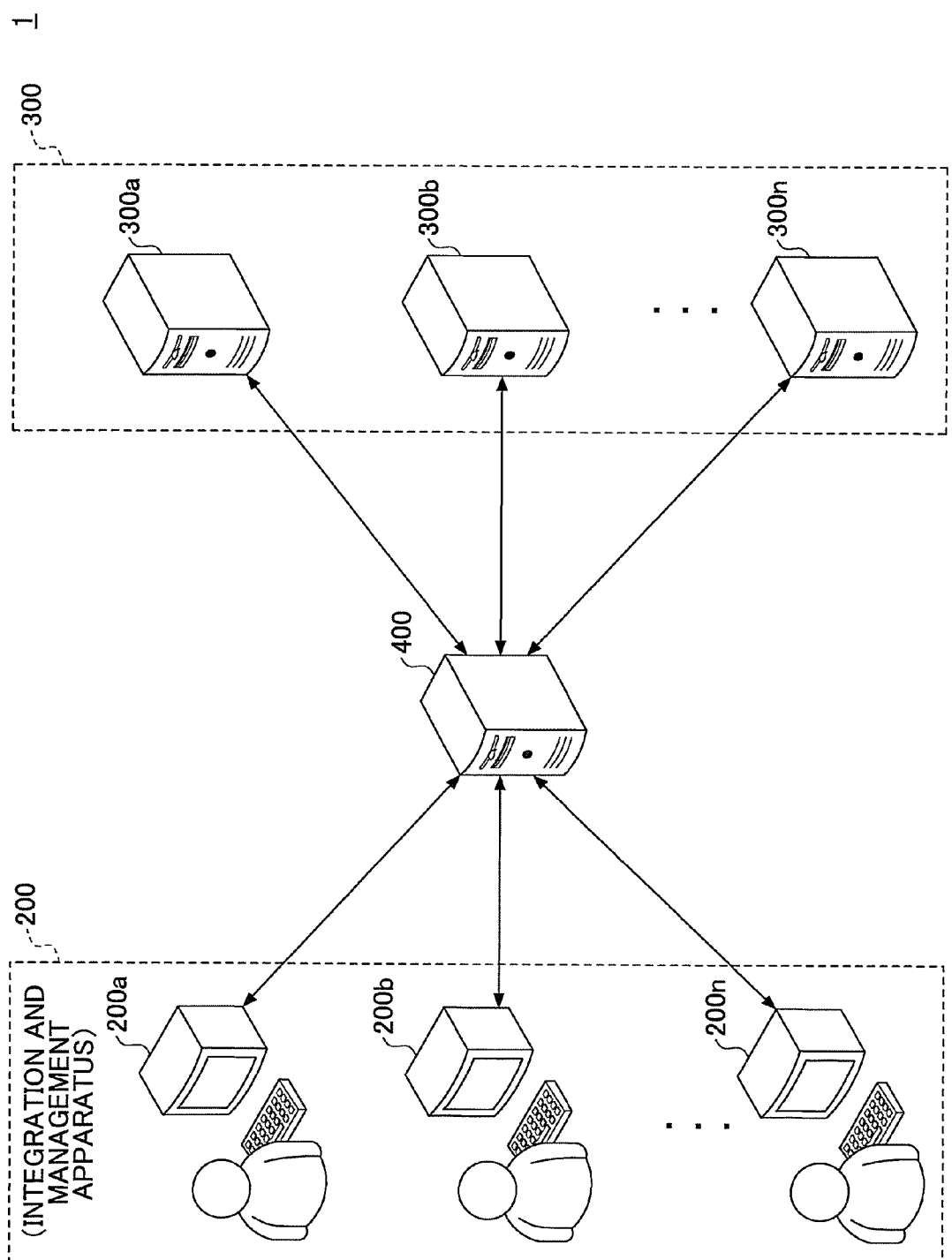
FIG. 11 shows a configuration example of an integration and management system in a second variant embodiment of the first embodiment of the present invention.

FIG. 11 shows a configuration example of an integration and management system in a second variant embodiment of the first embodiment.

According to the second variant embodiment, as shown in FIG. 11, the software that realizes the software integration and management function is installed in each of user terminals 200a, 200b, . . . and 200n, and thus, each of the user terminals 200a, 200b, . . . and 200n acts as an integration and management apparatus. However, in the second variant embodiment, only the function of obtaining the linkage software components 32a, . . . and 32n from the software 31a, . . . and 31n that operates in the servers 300a, . . . and 300n, and storing the obtained linkage software components 32a, . . . and 32n, is unitarily managed by an information collecting apparatus 400 (data management server).

FIG. 12 shows a configuration example of the software integration and management function according to the second variant embodiment.

A difference from the functional configuration shown in FIG. 10 is that in the software integration and management function according to the second variant embodiment, as shown in FIG. 12, the information collecting apparatus 400 has the linkage software component obtaining part 41, the linkage information storing part 42 and the linkage information analyzing part 43, while each user terminal 200a, . . . or 200n acting as the integration and management apparatus has the request receiving part 44, the linkage operation carrying out part 45 and the function providing part 46. Other than the difference, the second variant embodiment may have the same functional configuration as that of the first variant embodiment described above, and duplicate description will be omitted.

As described above with reference to FIGS. 9 through 12, the software integration and management function can be realized by the software, and thus, it is possible to provide the software integration and management function in various methods suitable to each particular user environment.

The first embodiment and the first and second variant embodiments of the first embodiment have been described. The "software integration and management function" that the integration and management apparatus 100 has according to the first embodiment is realized as a result of the program that is obtained from encoding the respective process procedures described above with reference to figures by a programming language suitable to the operating environment (platform) being executed by the CPU 106 (see FIG. 2).

The above-mentioned program may be stored in the computer readable information recording medium 103a. The recording medium 103a is, for example, a floppy (registered trademark) disk, a CD (Compact Disk), a DVD (Digital Versatile Disk), a SD memory card, a USB (Universal Serial Bus) memory, or such.

Therefore, the above-mentioned program may be installed in the integration and management apparatus 100 by using the drive device 103 by which the recording medium 103a is readable or such, as a result of the program being stored in the recording medium 103a. Further, since the integration and management apparatus 100 includes the interface device 107, the above-mentioned program may be downloaded by using a telecommunication line such as the Internet, and then, installed in the integration and management apparatus 100.

Further, in the first embodiment, the integration and management system 1 carries out integration and management of the pieces of software that operates in the servers 300a, 300b, . . . and 300n, respectively. The servers 300a, 300b, . . . and 300n may include image processing apparatuses such as a MFP or a LP. In such a case, assuming that the pieces of software, of which integration and management are carried out by the software integration and management function according to the first embodiment, include a piece of software that realizes the apparatus management function for managing one or plural image processing apparatuses, the following configuration may be provided. That is, in the integration and management system 1, the integration and management apparatus 100 is connected with the one or plural image processing apparatuses, and the software that realizes the apparatus management function operates in the integration and management apparatus 100 (i.e., the integration and management apparatus 100 itself has the apparatus management function).

The present invention is not limited to the specifically disclosed embodiments, and variations and modifications may be made without departing from the scope of the present invention.

The present application is based on Japanese priority application No. 2009-209662 filed Sep. 10, 2009, the entire contents of which are hereby incorporated herein by reference.

What is claimed is:

1. An integration and management apparatus that is connected, by using a predetermined data transmission path, to an information processing apparatus in which one or plural pieces of software operates, which one or plural pieces of software has a program interface opened to an outside and realizes a function, the integration and management apparatus comprising:
an obtaining part that obtains, by an application executed by a processor of the integration and management apparatus, from the software, a linkage software component including setting information and an extended program for a linkage of the function realized by the one or plural pieces of software;
a display part;
an analyzing part that analyzes the linkage software component further including a linkage setting file and apparatus list information, obtained by the obtaining part, and obtains and displays an analyzing result on the display part, the analyzing result including contents of an apparatus list and a plug-in flow method; and
an executing part that executes, in response to a function providing request, the extended program, and carries out the linkage of the function by using the program interface provided by the software, based on the analyzing result obtained by the analyzing part.

2. The integration and management apparatus as claimed in claim 1, wherein:
the analyzing part analyzes the linkage setting file, included in the linkage software component obtained by the obtaining part, in which linkage setting file various information necessary for the linkage of the function is set, and obtains the analyzing result that includes information indicating whether there is the function to be linked for realizing the requested function.

3. The integration and management apparatus as claimed in claim 2, wherein:
the analyzing part determines whether the linkage software component includes the linkage setting file that has not been analyzed yet, and
in a case where the linkage software component includes the linkage setting file that has not been analyzed yet, the analyzing part analyzes setting contents in the linkage setting file that has not been analyzed yet, and obtains the analyzing result that includes a setting concerning the linkage of the function.

4. The integration and management apparatus as claimed in claim 1, wherein:
when receiving the function providing request, the executing part determines whether there is the function to be linked for realizing the requested function, and
in a case where there is the function to be linked for realizing the requested function, the executing part executes the extended program included in the linkage software component according to a setting concerning the linkage of the function included in the analyzing result, and carries out the linkage of the function by using the program interface that the software provides.

5. The integration and management apparatus as claimed in claim 1, wherein: the program interface is an API (Application Program Interface).

6. An integration and management system comprising:
an information processing apparatus in which one or plural pieces of software operates, which one or plural pieces of software has a program interface opened to an outside and realizes a function, and;
an integration and management apparatus that carries out integration and management of the software and is connected with the information processing apparatus by using a predetermined data transmission path, wherein
the integration and management apparatus comprising:
an obtaining part that obtains, by an application executed by a processor of the integration and management apparatus, from the software, a linkage software component including setting information and an extended program for the linkage of the function realized by the one or plural pieces of software;
a display part;
an analyzing part that analyzes the linkage software component further including a linkage setting file and apparatus list information, obtained by the obtaining part, and obtains and displays an analyzing result on the display part, the analyzing result including contents of an apparatus list and a plug-in flow method; and
an executing part that executes, in response to a function providing request, the extended program, and carries out the linkage of the function by using the program interface provided by the software provides, based on the analyzing result obtained by the analyzing part.

7. The integration and management system as claimed in claim 6, wherein:
the analyzing part of the integration and management apparatus analyzes the linkage setting file, included in the linkage software component obtained by the obtaining part, in which linkage setting file various information necessary for the linkage of the function is set, and obtains the analyzing result that includes information indicating whether there is the function to be linked for realizing the requested function.

8. The integration and management system as claimed in claim 7, wherein:
the analyzing part of the integration and management apparatus determines whether the linkage software component includes the linkage setting file that has not been analyzed yet, and
in a case where the linkage software component includes the linkage setting file that has not been analyzed yet, the analyzing part analyzes setting contents in the linkage setting file that has not been analyzed yet, and obtains the analyzing result that includes a setting concerning the linkage of the function.

9. The integration and management system as claimed in claim 6, wherein:
when receiving the function providing request, the executing part of the integration and management apparatus determines whether there is the function to be linked for realizing the requested function, and
in a case where there is the function to be linked for realizing the requested function, the executing part executes the extended program included in the linkage software component according to a setting concerning the linkage of the function included in the analyzing result, and carries out the linkage of the function by using the program interface provided by the software.

10. The integration and management system as claimed in claim 6, wherein: the program interface is an API (Application Program Interface).

11. A computer readable information recording medium storing a program which is executed by a computer processor of an integration and management apparatus that is connected, by using a predetermined data transmission path, to an information processing apparatus in which one or plural pieces of software operates, which one or plural pieces of software has a program interface opened to an outside and realizes a function, which program, when executed by the computer processor, carries out:

obtaining, from the software, a linkage software component including setting information and an extended program for a linkage of the function realized by the one or plural pieces of software;
analyzing the obtained linkage software component further including a linkage setting file and apparatus list information, and obtaining and displaying an analyzing result on a display part, the analyzing result including contents of an apparatus list and a plug-in flow method; and
executing, in response to a function providing request, the extended program, and carrying out the linkage of the function by using the program interface provided by the software, based on the analyzing result.

12. The computer readable information recording medium as claimed in claim 11, the program carrying out:
analyzing the linkage setting file included in the obtained linkage software component, in which linkage setting file various information necessary for the linkage of the function is set, where the result that includes information indicating whether there is the function to be linked for realizing the requested function is obtained.

13. The computer readable information recording medium as claimed in claim 12, the program carrying out:
determining whether the linkage software component includes the linkage setting file that has not been analyzed yet, and
in a case where the linkage software component includes the linkage setting file that has not been analyzed yet, analyzing setting contents of the linkage setting file that has not been analyzed yet, and obtaining an analyzing result that includes a setting concerning the linkage of the function.

14. The computer readable information recording medium as claimed in claim 11, the program carrying out:
when the integration and management apparatus receives the function providing request, determining whether there is the function to be linked for realizing the requested function, and
in a case where there is the function to be linked for realizing the requested function, executing the extended program included in the linkage software component according to a setting concerning the linkage of the function included in the analyzing result, and carrying out the linkage of the function by using the program interface provided by the software.

15. The computer readable information recording medium as claimed in claim 11, wherein:
the program interface is an API (Application Program Interface).

* * * * *